(12) United States Patent
Bulloch

(10) Patent No.: US 8,001,867 B2
(45) Date of Patent: Aug. 23, 2011

(54) SHEAVE AND GEAR MECHANISM

(75) Inventor: Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 12/401,083

(22) Filed: Mar. 10, 2009

(65) Prior Publication Data

US 2010/0229666 A1    Sep. 16, 2010

(51) Int. Cl.
*F16H 55/18* (2006.01)
(52) U.S. Cl. .......................................... 74/409
(58) Field of Classification Search ............ 74/409, 74/412 R, 413, 440, 445
See application file for complete search history.

(56) References Cited

U.S. PATENT DOCUMENTS

| 1,067,144 | A | | 7/1913 | Schilling | |
|---|---|---|---|---|---|
| 3,548,673 | A | * | 12/1970 | Suchocki | 74/409 |
| 4,671,129 | A | * | 6/1987 | Lovrenich | 74/370 |
| 5,257,543 | A | | 11/1993 | Fogelberg | |
| 6,997,076 | B2 | * | 2/2006 | Menjak et al. | 74/409 |

FOREIGN PATENT DOCUMENTS

| DE | 10328482 A1 | | 1/2004 |
|---|---|---|---|
| KR | 2000054944 A | * | 9/2000 |

* cited by examiner

*Primary Examiner* — Vicky A Johnson
(74) *Attorney, Agent, or Firm* — Quinn Law Group, PLLC

(57) ABSTRACT

A gear mechanism includes a first gear mounted on a first shaft in meshing arrangement with a second gear mounted on a second shaft. A fixed sheave is mounted on the first shaft. A first sliding sheave and a second sliding sheave are mounted on the second shaft. The first sliding sheave and the second sliding sheave are in contact with the fixed sheave.

15 Claims, 2 Drawing Sheets

SHEAVE AND GEAR MECHANISM

TECHNICAL FIELD

The present invention relates generally to a gear mechanism for parallel axis gears, and more specifically, to gear mechanism to reduce gear rattle for parallel axis gears.

BACKGROUND OF THE INVENTION

Automotive vehicles commonly use gear arrangements where meshing gears rotate in opposite directions on parallel axes. For example, transmissions include balance shafts which utilize parallel axis gears. However, oscillations occurring on the driving shaft of such gear arrangements, such as from engine vibrations, may cause the meshing gears of the parallel gear mechanism to lash with respect to one another, resulting in gear rattle.

SUMMARY OF THE INVENTION

A gear mechanism has a first shaft with a first gear mounted thereon. The first shaft and the first gear rotate in a first rotational direction. A second shaft is parallel to the first shaft. The second shaft has a second gear mounted thereon and rotates in a second rotational direction opposite of the first rotational direction. A fixed sheave is mounted on the first shaft and rotates in the first rotational direction. A first sliding sheave is mounted on the second shaft and rotates in the second rotational direction and a second sliding sheave is mounted on the second shaft and rotates in the second rotational direction. The first sliding sheave and the second sliding sheave are in contact with the fixed sheave.

A method of reducing gear rattle for the gear mechanism includes rotating the first shaft in the first rotational direction. A first gear mounted to the first shaft, and rotating therewith, drives a second shaft. The second shaft is driven in the second rotational direction and has a second gear mounted thereon and rotating therewith. Finally, the first sliding sheave is biased in a first axial direction to contact the fixed sheave and the second sliding sheave is biased in a second axial direction to contact the fixed sheave.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
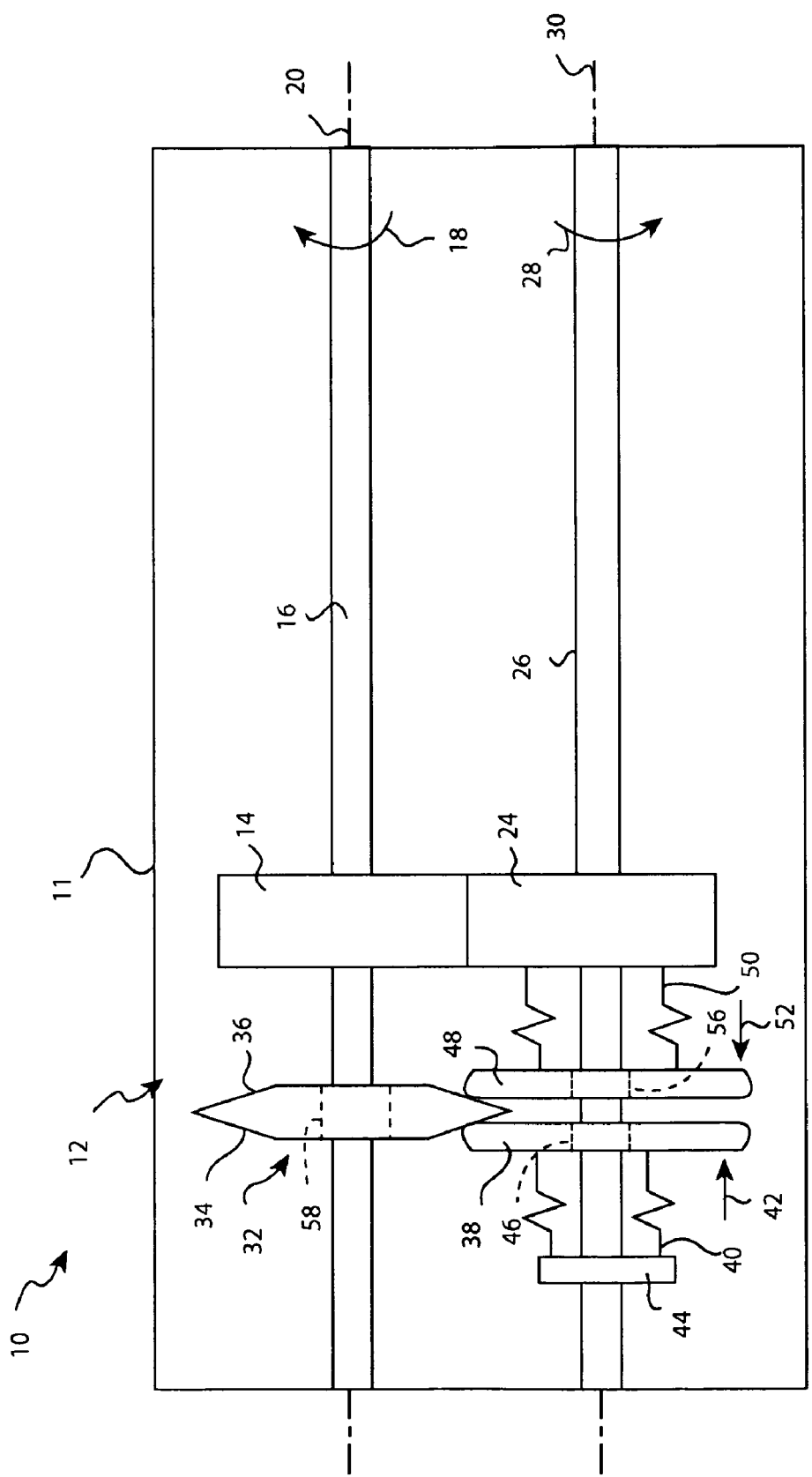
FIG. 1 is a schematic side view illustration of a parallel axis gear mechanism for a transmission for a vehicle.

Referring to the Figures, wherein like reference numbers refer to the same or similar components throughout the several views, FIG. 1 is a schematic side view of an exemplary vehicle 10 having a transmission 11 with a parallel axis gear mechanism 12. The parallel axis gear mechanism 12 has a first gear 14 mounted on a first shaft 16 and rotating in a first rotational direction 18 with the first shaft 16 about a first axis 20. The first axis 20 is defined by the first shaft 16. A second gear 24 is mounted on a second shaft 26 and rotates in a second rotational direction 28 with the second shaft 26 about a second axis 30. The first gear 14 and the second gear 24 are in meshing relation to one another. The second axis 30 is defined by the second shaft 26 and is parallel to the first shaft 16 and the first axis 20. In the embodiment shown the first shaft 16 and first gear 14 are preferably the driving shaft and gear and the second shaft 26 and the second gear 24 are preferably the driven shaft and gear.

A fixed sheave 32 is mounted on and rotates with the first shaft 16 in the first rotational direction 18. The fixed sheave 32 includes a first tapered portion 34 and a second tapered portion 36. The first tapered portion 34 and the second tapered portion 36 are located on opposing sides of the fixed sheave 32.

A first sliding sheave 38 is slidably mounted on the second shaft 26. The first sliding sheave 38 rotates with the second shaft 26 and may slide axially along the second shaft 26. The first sliding sheave 38 is biased by a first spring 40 in a first axial direction 42 along the second shaft 26. The first sliding sheave 38 applies force to the first tapered portion 34 of the fixed sheave 32. The first spring 40 is preferably a coil spring mounted around the second shaft 26. A first support 44 may be mounted to the second shaft 26 to support and create bias for the first spring 40. The first support 44 places the first spring 40 in compression. Therefore, the first spring 40 slides the first sliding sheave 38 in the first axial direction 42 to apply force to the first tapered portion 34. A first bushing 46 may be located between the first sliding sheave 38 and the second shaft 26 to assist in axial movement of the first sliding sheave 38 relative to the second shaft 26.

A second sliding sheave 48 is also slidably mounted on the second shaft 26. The second sliding sheave 48 rotates with the second shaft 26 in the second rotational direction 28 and may slide axially along the second shaft 26. The second sliding sheave 48 is biased by a second spring 50 in a second axial direction 52 along the second shaft 26. The second sliding sheave 48 applies force to the second tapered portion 36 of the fixed sheave 32. The second spring 50 is preferably a coil spring mounted around the second shaft 26. The second spring 50 may be mounted to the second gear 24 for support. The second gear 24 would also place the second spring 50 in compression. Therefore, the second spring 50 slides the second sliding sheave 48 in the second axial direction 52 to apply force to the second tapered portion 36. A second bushing 56 may be located between the second sliding sheave 48 and the second shaft 26 to assist in axial movement of the second sliding sheave 48 relative to the second shaft 26.

The first sliding sheave 38 and the second sliding sheave 48 apply pressure to the fixed sheave 32. Thus, a continual load is placed on the fixed sheave 32 by the first sliding sheave 38 and the second sliding sheave 48. The load on the fixed sheave 32 by the first sliding sheave 38 and the second sliding sheave 48 accommodates for any oscillations that may occur between the first shaft 16 and the second shaft 26, reducing or eliminating the lash occurring between the first gear 14 and the second gear 24.

The first tapered portion 34 and the second tapered portion 36 of the fixed sheave 32 may have a friction coating or surface to reduce the continuous friction applied between the fixed sheave 32 and the first and second sliding sheaves 38 and 48. Likewise, the first sliding sheave 38 and the second sliding sheave 48 may also have a friction coating or surface on the areas that would contact the fixed sheave 32. The type of friction coating or surface may be determined based upon the amount of friction between the corresponding surfaces.

One skilled in the art would know the proper friction coating or surface required for a particular parallel gear mechanism 10.

The first sliding sheave 38 and the second sliding sheave 48 are arranged to apply approximately equal force to the first tapered portion 34 and the second tapered portion 36 of the fixed sheave 32. The fixed sheave 32 may include a bushing 58 to accommodate any differences in force applied to the first tapered portion 34 and the second tapered portion 36.

The size and length of the first spring 40 and the second spring 50 may be determined based upon the desired force to be applied to the fixed sheave 32 and the desired friction between the fixed sheave 32 and the first and the second sliding sheave 38 and 48. One skilled in the art would know the proper size and length for the first spring 40 and the second spring 50 to achieve a desired application force for a particular parallel gear mechanism 12.

In the embodiment schematically illustrated in FIG. 1, the fixed sheave 32, first sliding sheave 38 and second sliding sheave 48 are shown schematically to the left of the first gear 14 and the second gear 24. The fixed sheave 32, first sliding sheave 38 and second sliding sheave 48 may also be located on the schematic right-side of the first gear 14 and the second gear 24.

Figure 2:
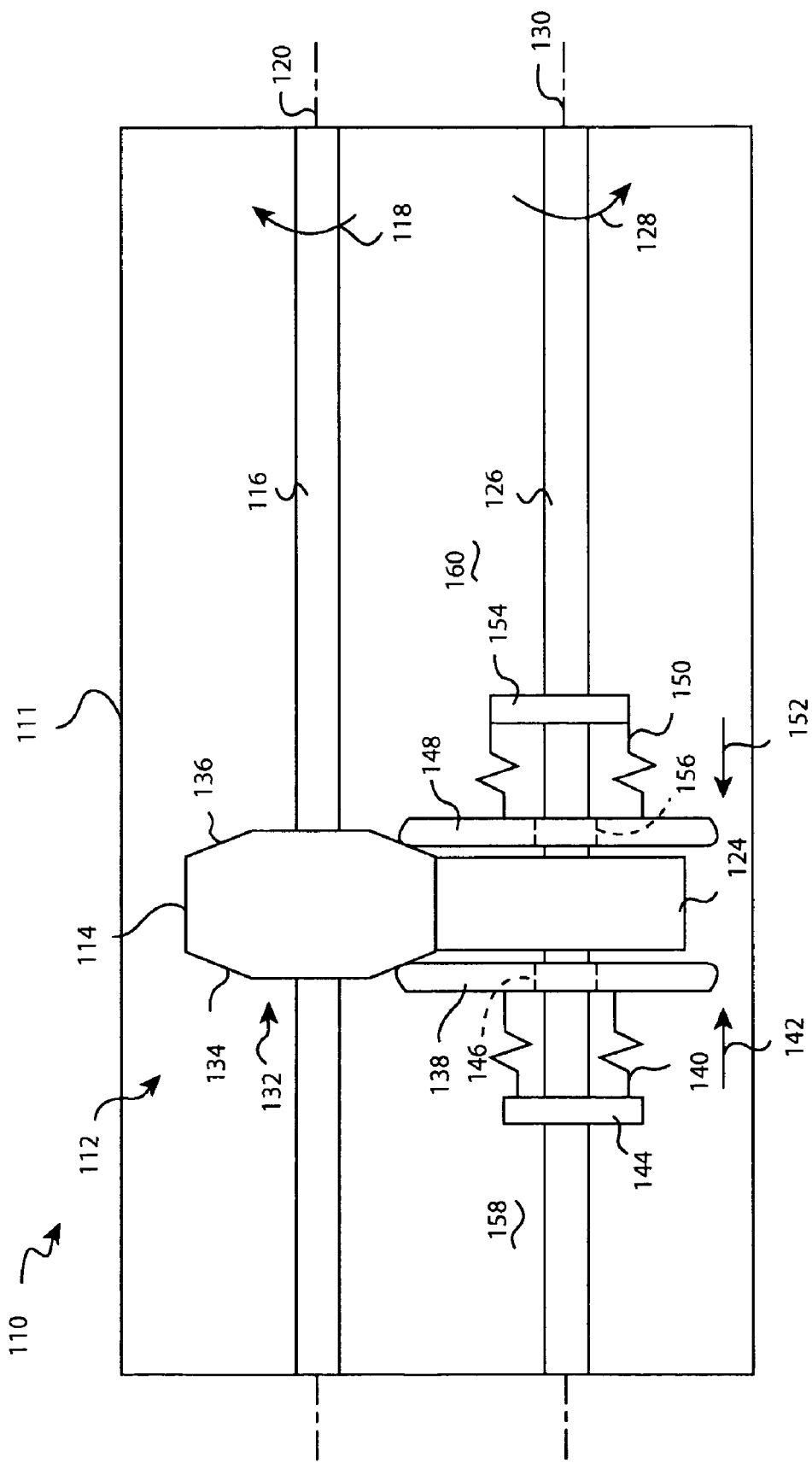
FIG. 2 is a schematic side view illustration of another embodiment of a parallel axis gear mechanism for a transmission for a vehicle.

FIG. 2 illustrates a schematic view of another exemplary vehicle 110 having a transmission 111 with a parallel axis gear mechanism 112. The parallel axis gear mechanism 112 has a first gear 114 mounted on a first shaft 116 and rotating in a first rotational direction 118 with the first shaft 116 about a first axis 120. The first axis 120 is defined by the first shaft 116. A second gear 124 is mounted on a second shaft 126 and rotates in a second rotational direction 128 with the second shaft 126 about a second axis 130. The first gear 114 and the second gear 124 are in meshing relation to one another. The second axis 130 is defined by the second shaft 126 and is thus, parallel to the first shaft 116 and the first axis 120.

A fixed sheave 132 is mounted on or integrally formed with the first gear 114. The fixed sheave 132 includes a first tapered portion 134 and a second tapered portion 136. The first tapered portion 134 and the second tapered portion 136 are located on opposing sides of the first gear 114.

A first sliding sheave 138 is slidably mounted on the second shaft 126. The first sliding sheave 138 rotates with the second shaft 126 and may slide axially along the second shaft 126. The first sliding sheave 138 is biased by a first spring 140 in a first axial direction 142 along the second shaft 126. The first sliding sheave 138 is located on a first side 158 of the second gear 124 and applies force to the first tapered portion 134 of the first gear 114. The first spring 140 is preferably a coil spring mounted around the second shaft 126. A first support 144 may be mounted to the second shaft 126 to support and create bias for the first spring 140. The first support 144 places the first spring 140 in compression. Therefore, the first spring 140 slides the first sliding sheave 138 in the first axial direction 142 to apply force to the first tapered portion 134. A first bushing 146 may be located between the first sliding sheave 138 and the second shaft 126 to assist in movement of the first sliding sheave 138 relative to the second shaft 126.

A second sliding sheave 148 is also slidably mounted on the second shaft 126 on a second side 160 of the second gear 124. The second sliding sheave 148 rotates with the second shaft 126 and may slide axially along the second shaft 126. The second sliding sheave 148 is biased by a second spring 150 in a second axial direction 152 along the second shaft 126. The second sliding sheave 148 applies force to the second tapered portion 136 of the first gear 114. The second spring 150 is preferably a coil spring mounted around the second shaft 126. A second support 154 may be mounted to the second shaft 126 to support and create bias for the second spring 150. The second support 154 places the second spring 150 in compression. Therefore, the second spring 150 slides the second sliding sheave 148 in the second axial direction 152 to apply force to the second tapered portion 136. A second bushing 156 may be located between the second sliding sheave 148 and the second shaft 126 to assist in movement of the second sliding sheave 148 relative to the second shaft 126.

The first sliding sheave 138 and the second sliding sheave 148 apply pressure to the first gear 114. Thus, a continual load is placed on the fixed sheave 132 by the first sliding sheave 138 and the second sliding sheave 148. The load on the fixed sheave 132 by the first sliding sheave 138 and the second sliding sheave 148 accommodates for any oscillations that may occur between the first shaft 116 and the second shaft 126, reducing or eliminating the lash occurring between the first gear 114 and the second gear 124.

Due to the continuous friction applied between the first gear 114, the first sliding sheave 138 and the second sliding sheave 148, the first tapered portion 134 and the second tapered portion 136 may have a friction coating or surface. Likewise, the first sliding sheave 138 and the second sliding sheave 148 may have a friction coating or surface on the areas that would contact the first gear 114. The type of friction coating or surface may be determined based upon the amount of friction between the corresponding surfaces. One skilled in the art would know the proper friction coating or surface required for a particular parallel gear mechanism 112.

The first sliding sheave 138 and the second sliding sheave 148 are arranged to apply approximately equal force to the first tapered portion 134 and the second tapered portion 136. The size and length of the first spring 140 and the second spring 150 may be determined based upon the desired force to be applied to the first gear 114 and the desired friction between the first gear 114 and the first sliding sheave 138 and the second sliding sheave 148.

While the best modes for carrying out the invention have been described in detail, those familiar with the art to which this invention relates will recognize various alternative designs and embodiments for practicing the invention within the scope of the appended claims.

The invention claimed is:

1. A gear mechanism comprising:
 a first shaft having a first gear mounted thereon, wherein the first shaft and the first gear rotate in a first rotational direction;
 a second shaft, parallel to the first shaft, wherein the second shaft has a second gear mounted thereon and meshing with the first gear so that the second shaft and the second gear rotate in a second rotational direction opposing the first rotational direction;
 a fixed sheave mounted on the first shaft for rotation therewith;
 a first sliding sheave mounted on the second shaft for rotation therewith; and
 a second sliding sheave mounted on the second shaft for rotation therewith, wherein the first sliding sheave and the second sliding sheave are in contact with the fixed sheave for reducing gear rattle.

2. The gear mechanism of claim 1, further comprising:
 a first spring mounted around the second shaft, wherein the first spring biases the first sliding sheave in a first axial direction along the second shaft; and a second spring mounted around the second shaft, wherein the second spring biases the second sliding sheave in a second axial direction along the second shaft, and wherein the second axial direction is opposite of the first axial direction.

3. The gear mechanism of claim 2, further comprising a first support mounted to the second shaft to support and bias the first spring in the first axial direction.

4. The gear mechanism of claim 3, further comprising a second support mounted to the second shaft to support and bias the second spring in the second axial direction.

5. The gear mechanism of claim 3, wherein the second gear is configured to support and bias the second spring in the second axial direction.

6. The gear mechanism of claim 1, wherein the fixed sheave further comprises a first tapered portion and a second tapered portion, and wherein the first sliding sheave is in contact with the first tapered portion and the second sliding sheave is in contact with the second tapered portion.

7. A transmission having a gear mechanism comprising:
   a first shaft having a first gear mounted thereon, wherein the first shaft and the first gear rotate in a first rotational direction;
   a second shaft, parallel to the first shaft, wherein the second shaft has a second gear mounted thereon and meshing with the first gear so that the second shaft and the second gear rotate in a second rotational direction opposing the first rotational direction;
   a fixed sheave mounted on the first shaft for rotation therewith;
   a first sliding sheave mounted on the second shaft for rotation therewith;
   a second sliding sheave mounted on the second shaft for rotation therewith, wherein the first sliding sheave and the second sliding sheave are in contact with the fixed sheave for reducing gear rattle;
   a first spring mounted around the second shaft, wherein the first spring biases the first sliding sheave in a first axial direction along the second shaft; and
   a second spring mounted around the second shaft, wherein the second spring biases the second sliding sheave in a second axial direction along the second shaft, and wherein the second axial direction is opposite of the first axial direction.

8. The transmission of claim 7, further comprising a first support mounted to the second shaft to support and bias the first spring in the first axial direction.

9. The transmission of claim 8, further comprising a second support mounted to the second shaft to support and bias the second spring in the second axial direction.

10. The transmission of claim 8, wherein the second gear is configured to support and bias the second spring in the second axial direction.

11. The transmission of claim 7, wherein the fixed sheave further comprises a first tapered portion and a second tapered portion, and wherein the first sliding sheave is in contact with the first tapered portion and the second sliding sheave is in contact with the second tapered portion.

12. A method of reducing gear rattle in a gear mechanism comprising:
   rotating a first shaft having a first gear mounted thereon in a first rotational direction to thereby drive a second shaft, having a second gear mounted thereon, in a second rotational direction opposing the first rotational direction, wherein the second gear is in meshing engagement with the first gear;
   biasing a first sliding sheave mounted on the second shaft in a first axial direction to contact a fixed sheave mounted on the first shaft; and
   biasing a second sliding sheave mounted on the second shaft in a second axial direction to contact the fixed sheave to thereby reduce gear rattle.

13. The method of claim 12, wherein the biasing the first sliding sheave further comprises compressing and supporting a first spring mounted around the second shaft with a first support.

14. The method of claim 12, wherein the biasing the second sliding sheave further comprises compressing and supporting a second spring mounted around the second shaft with a second support.

15. The method of claim 12, wherein the biasing the second sliding sheave further comprises compressing and supporting a second spring mounted around the second shaft with the second gear.

* * * * *